(12) United States Patent
Wang et al.

(10) Patent No.: US 12,538,281 B2
(45) Date of Patent: Jan. 27, 2026

(54) METHOD AND DEVICE FOR REPORTING DIRECT CURRENT CARRIER LOCATION, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Shukun Wang, Dongguan (CN); Jinqiang Xing, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 420 days.

(21) Appl. No.: 18/145,580

(22) Filed: Dec. 22, 2022

(65) Prior Publication Data

US 2023/0269716 A1 Aug. 24, 2023

Related U.S. Application Data

(63) Continuation of application No. PCT/CN2020/123379, filed on Oct. 23, 2020.

(51) Int. Cl.
*H04W 72/0453* (2023.01)
*H04W 72/21* (2023.01)

(52) U.S. Cl.
CPC ....... *H04W 72/0453* (2013.01); *H04W 72/21* (2023.01)

(58) Field of Classification Search
CPC .............. H04W 72/0453; H04W 72/21; H04L 5/0098; H04L 5/001
See application file for complete search history.

(56) References Cited

U.S. PATENT DOCUMENTS

| 12,273,223 | B2 * | 4/2025 | Ko | H04L 27/26025 |
| 2019/0313394 | A1 * | 10/2019 | Kubota | H04L 5/001 |
| 2022/0150880 | A1 | 5/2022 | Kubota | |
| 2022/0272650 | A1 * | 8/2022 | Ko | H04W 56/0045 |
| 2022/0312416 | A1 * | 9/2022 | Venkata | H04L 5/0094 |
| 2023/0071803 | A1 * | 3/2023 | Liu | H04W 24/08 |

(Continued)

FOREIGN PATENT DOCUMENTS

| CN | 110536341 A | 12/2019 |
| CN | 111787554 A | 10/2020 |
| WO | 2019199814 A1 | 10/2019 |

OTHER PUBLICATIONS

Ericsson, "DC location reporting for intra-band UL CA", 3GPP TSG-RAN WG2 #112-e Tdoc R2-2010048, Electronic meeting, Nov. 2-13, 2020. 8 pages.

(Continued)

*Primary Examiner* — Brian D Nguyen
(74) *Attorney, Agent, or Firm* — PERKINS COIE LLP (57) ABSTRACT

A method for reporting a Direct Current (DC) carrier location includes: a terminal device reports at least one piece of DC carrier location information, where each of the at least one piece of DC carrier location information is associated with N cells and N bandwidth parts (BWPs), and N is a positive integer. The N cells are N severing cells in an active state among M severing cells, the N BWPs are N active BWPs of the N cells, and the active BWPs are not dormant BWPs; and M is a positive integer greater than or equal to N.

20 Claims, 3 Drawing Sheets

---

A terminal device reports at least one piece of DC carrier location information, and a network device receives at least one piece of DC carrier location information reported by the terminal device, each of the at least one piece of DC carrier location information being associated with N cells and N bandwidth parts (BWPs), where N is a positive integer, the N cells are N severing cells in an active state among M severing cells, the N BWPs are N active BWPs of the N cells, and the active BWPs are not dormant BWPs, M being a positive integer greater than or equal to N

301

(56) References Cited

U.S. PATENT DOCUMENTS

2023/0131328 A1* 4/2023 Zhang .................... H04L 5/001
370/329
2023/0164702 A1* 5/2023 Lee ....................... H04W 52/28
455/522

OTHER PUBLICATIONS

RAN4, "LS on additional DC location reporting for intra-band UL CA", 3GPP TSG-RAN WG4 Meeting # 96-e R4-2011906, Electronic Meeting, Aug. 17-28, 2020. 2 pages.
Qualcomm Incorporated, "Consideration on direct current location signalling", 3GPP TSG-RAN WG2 Meeting #101bis R2-1806191, Sanya, China, Apr. 16-20, 2018. 2 pages.
Huawei, HiSilicon, "On intra-band CA DC location", 3GPP TSG-RAN4 WG4 Meeting # 95-e R4-2008149, Electronic meeting, May 25-Jun. 5, 2020. 2 pages.
International Search Report in the international application No. PCT/CN2020/123379, mailed on Jul. 21, 2021. 5 pages with English translation.
Written Opinion of the International Search Authority in the international application No. PCT/CN2020/123379, mailed on Jul. 21, 2021. 6 pages with English translation. .
3GPP "3rd Generation Partnership Project; Technical Specification Group Radio Access Network; NR; Radio Resource Control (RRC) protocol specification (Release 16)" TS 38.331 V16.1.0, Technical Specification, (Jul. 2020). 902 pages.
Supplementary European Search Report in the European application No. 20958348.3, mailed on Nov. 8, 2023. 8 pages.
Second Office Action of the Chinese application No. 202080105884. 0, issued on Jul. 22, 2024. 14 pages with English translation.
First Office Action of the Chinese application No. 202080105884.0, issued on Mar. 14, 2024, 20 pages with English translation.

* cited by examiner

| $C_7$ | $C_6$ | $C_5$ | $C_4$ | $C_3$ | $C_2$ | $C_1$ | R | Oct1 |
| --- | --- | --- | --- | --- | --- | --- | --- | --- |
| $C_{15}$ | $C_{14}$ | $C_{13}$ | $C_{12}$ | $C_{11}$ | $C_{10}$ | $C_9$ | $C_8$ | Oct2 |
| $C_{23}$ | $C_{22}$ | $C_{21}$ | $C_{20}$ | $C_{19}$ | $C_{18}$ | $C_{17}$ | $C_{16}$ | Oct3 |
| $C_{31}$ | $C_{30}$ | $C_{29}$ | $C_{28}$ | $C_{27}$ | $C_{26}$ | $C_{25}$ | $C_{24}$ | Oct4 |

FIG. 2B

A terminal device reports at least one piece of DC carrier location information, and a network device receives at least one piece of DC carrier location information reported by the terminal device, each of the at least one piece of DC carrier location information being associated with N cells and N bandwidth parts (BWPs), where N is a positive integer, the N cells are N severing cells in an active state among M severing cells, the N BWPs are N active BWPs of the N cells, and the active BWPs are not dormant BWPs, M being a positive integer greater than or equal to N — 301

FIG. 3

Device for reporting DC carrier location information

Reporting unit 401

FIG. 4

Device for reporting DC carrier location information

Receiving unit 501

METHOD AND DEVICE FOR REPORTING DIRECT CURRENT CARRIER LOCATION, TERMINAL DEVICE, AND NETWORK DEVICE

CROSS-REFERENCE TO RELATED APPLICATION

This application is a continuation of International Application No. PCT/CN2020/123379 filed on Oct. 23, 2020, the disclosure of which is hereby incorporated by reference in its entirety.

BACKGROUND

DC carrier can also be called DC subcarrier, which is not actually used in the Orthogonal Frequency Division Multiplexing (OFDM) transmission mechanism. In a New Radio (NR) system, a terminal device reports the DC carrier location information to the network side through Radio Resource Control (RRC) signaling, so that the network side removes a received part corresponding to the DC carrier location when demodulating data. At present, DC carrier location is reported for each Band Width Part (BWP) on each cell (that is, carrier), but there will be multiple Component Carrier (CC) in a Carrier Aggregation (CA) scenario, so how to report the DC carrier location in this scenario needs to be specified.

SUMMARY

Embodiments of the disclosure relates to the technical field of mobile communication, and in particular to, a method and device for reporting a Direct Current (DC) carrier location, a terminal device and a network device.

Embodiments of the disclosure provide a method and device for reporting a DC carrier location, a terminal device and a network device.

The method for reporting a DC carrier location provided by the embodiments of the disclosure includes an operation as follows. A terminal device reports at least one piece of DC carrier location information, where each of the at least one piece of DC carrier location information is associated with N cells and N bandwidth parts (BWPs), where N is a positive integer. The N cells are N severing cells in an active state among M severing cells, the N BWPs are N active BWPs of the N cells, and the active BWPs are not dormant BWPs; and M is a positive integer greater than or equal to N.

The method for reporting a DC carrier location provided by the embodiments of the disclosure includes an operation as follows. A network device receives at least one piece of DC carrier location information reported by a terminal device, where each of the at least one piece of DC carrier location information is associated with N cells and N bandwidth parts (BWPs), where N is a positive integer. The N cells are N severing cells in an active state among M severing cells, the N BWPs are N active BWPs of the N cells, and the active BWPs are not dormant BWPs; and M is a positive integer greater than or equal to N.

Embodiments of the disclosure provide a device for reporting a DC Carrier location, applied to a terminal device. The device includes a processor; and a memory for storing computer-executable instructions. The processor is configured to invoke and run the computer-executable instructions stored in the memory, to perform operations of: reporting at least one piece of DC carrier location information, where each of the at least one piece of DC carrier location information is associated with N cells and N bandwidth parts (BWPs), and N is a positive integer. The N cells are N severing cells in an active state among M severing cells, the N BWPs are N active BWPs of the N cells, and the active BWPs are not dormant BWPs; and M is a positive integer greater than or equal to N.

BRIEF DESCRIPTION OF THE DRAWINGS

The drawings described herein are used to provide a further understanding of the disclosure and form a part of the disclosure. The schematic embodiments of the disclosure and the description thereof are used to explain the disclosure and do not constitute an improper limitation of the disclosure. In the drawings.

DETAILED DESCRIPTION

The technical solution in the embodiments of the disclosure will be described below in conjunction with the drawings in the embodiments of the disclosure. It is apparent that the described embodiments are a part of the embodiments of the disclosure, not all of the embodiments. Based on the embodiments in the disclosure, all other embodiments obtained by those skilled in the art without creative effort belong to the protection scope of the disclosure.

The technical solutions of the embodiments of the present disclosure may be applied to various communication systems, such as Long Term Evolution (LTE) system, LTE Frequency Division Duplex (FDD) system, LTE Time Division Duplex (TDD), system, $5^{th}$ generation (5G) communication system or future communication system, etc.

Figure 1:
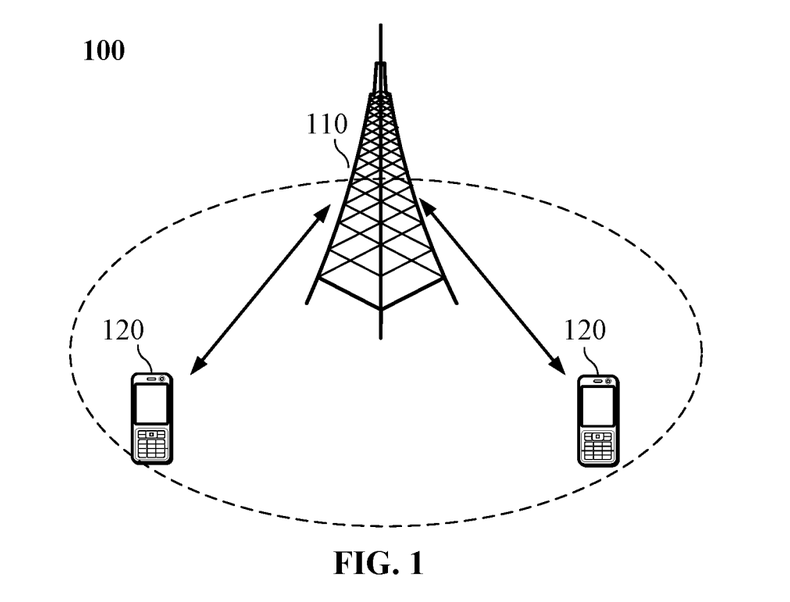
FIG. 1 is a schematic diagram of a communication system architecture according to an embodiment of the present disclosure.

Exemplarily, a communication system 100 applied to the embodiment of the present disclosure is shown in FIG. 1. The communication system 100 may include a network device 110, and the network device 110 may be a device communicating with a terminal device 120 (or called a communication terminal, a terminal). The network device 110 may provide communication coverage for a particular geographical region and may communicate with a terminal device located in the coverage region. Optionally, the network device 110 may be a Base Transceiver Station (BTS) in the GSM or the CDMA system, may also be a NB in the WCDMA system, and may further be an eNB or eNodeB in the LTE system or a wireless controller in a Cloud Radio Access Network (CRAN). Or the network device may be a mobile switching center, a relay station, an access point, an in-vehicle device, a wearable device, a hub, a switch, a network bridge, a router, a network-side device in a 5G network, a network device in a future communication system or the like.

The communication system 100 also includes at least one terminal device 120 located within coverage of the network device 110. As used herein, the "terminal device" includes, but is not limited to be connected: via a wired line, such as via a Public Switched Telephone Networks (PSTN), a Digital Subscriber Line (DSL), a digital cable, a direct cable connection; and/or another data connection/network; and/or via a wireless interface, for example, for a cellular network, a Wireless Local Area Network (WLAN), a digital television network such as a DVB-H network, a satellite network, a AM-FM broadcast transmitter; and/or means of another terminal device arranged to receive/transmit communication signals; and/or an Internet of Things (IoT) device. The terminal device configured to communicate through a wireless interface may be referred to as a "radio communication terminal", a "radio terminal" or a "mobile terminal". Examples of the mobile terminal include, but are not limited to: a satellite or cellular telephone; a Personal Communications System (PCS) terminal that may combine a cellular radio telephone with data processing, facsimile, and data communication capabilities; a Personal Digital Assistant (PDA) that may include a radio telephone, a pager, Internet/Intranet access, a Web browser, a notebook, a calendar, and/or a Global Positioning System (GPS) receiver; and conventional laptop and/or palmtop receivers or other electronic devices including radio telephone transceivers. The terminal device may refer to an access terminal, UE, a user unit, a user station, a mobile station, a mobile radio station, a remote station, a remote terminal, a mobile device, a user terminal, a terminal, a radio communication device, a user agent, or a user device. The access terminal may be a cellular telephone, a cordless telephone, a Session Initiation Protocol (SIP) telephone, a Wireless Local Loop (WLL) station, a PDA, a handheld device having a radio communication function, a computing device or other processing device connected to a radio modem, an in-vehicle device, a wearable device, a terminal device in a 5G network, a terminal device in a future evolved Public Land Mobile Network (PLMN), or the like.

Optionally, the terminals 120 may perform Device-to-Device (D2D) direct connection communications.

Optionally, a 5G communication system or 5G network may also be referred to as a New Radio (NR) system or an NR system.

FIG. 1 exemplarily illustrates one network device and two terminals. Optionally, the communication system 100 may include multiple network devices and other numbers of terminals may be included within a coverage of each network device, which are not limited in embodiments of the present disclosure.

Optionally, the communication system 100 may also include other network entities such as network controllers and mobility management entities, which are not limited in embodiments of the present disclosure.

It should be understood that a device having a communication function in a network/system in an embodiment of the present disclosure may be referred to as a communication device. Taking the communication system 100 shown in FIG. 1 as an example, the communication device may include a network device 110 and a terminal 120 each having a communication function, and the network device 110 and the terminal 120 may be specific devices described above and will not be described herein. The communication device may also include other devices in the communication system 100 such as network controllers, mobility management entities and other network entities, which are not limited in embodiments of the present disclosure.

It should be understood that the terms "system" and "network" are often used interchangeably herein. In the present disclosure, the term "and/or" is merely an association relationship that describes associated objects, indicating that there can be three relationships, for example, A and/or B means that there are three situations: A alone, A and B simultaneously, and B alone. In addition, the character "/" in the present disclosure generally indicates that the associated objects have a kind of "or" relationship.

In order to facilitate understanding of the technical schemes of the embodiments of the present disclosure, the technical schemes related to the embodiments of the present disclosure are described below.

With people's pursuit of speed, latency, high-speed mobility and energy efficiency, as well as the diversity and complexity of business in future life, the International Organization for Standardization (ISO) of the 3rd Generation Partnership Project (3GPP) began to develop the 5G mobile communication technology (hereinafter referred to as 5G for short). The main application scenarios of 5G are: enhanced Mobile Broadband (eMBB), Ultra-Reliable Low-Latency Communications (URLLC) and massive Machine-Type Communications (mMTC).

On one hand, eMBB still aims at users' access to multimedia content, services and data, the demand of eMBB is growing rapidly. On the other hand, eMBB may be deployed in different scenarios, such as indoor, urban and rural areas, and the capabilities and the demand of eMBB are quite different in different scenarios, so it cannot be generalized and must be analyzed in detail in combination with specific deployment scenarios. Typical applications of URLLC include industrial automation, power automation, telemedicine operation (surgery), traffic safety and so on. The typical characteristics of mMTC include high connection density, small data volume, delay-insensitive services, low cost and long service life of modules and so on.

In the early deployment of NR systems, it is difficult to obtain complete NR coverage, so the typical network coverage is in a mode of wide-area LTE coverage and NR island coverage. Moreover, a large number of LTE systems are deployed below 6 GHz, and there are few spectra below 6 GHz available for 5G. Therefore, NR must study the application of spectra above 6 GHz, but the coverage of high frequency band is limited and the signal fades quickly. Furthermore, in order to protect the early investment of mobile operators in LTE, a working mode of tight interworking between LTE and NR is proposed.

In 5G, the maximum channel bandwidth can be 400 MHz (which is called wideband carrier), which is very large compared with the maximum bandwidth of 20 MHz in LTE. If the terminal device keeps operating on the wideband carrier, the power consumption of the terminal device is very large. Therefore, it is suggested that the Radio Frequency (RF) bandwidth of the terminal device can be adjusted according to an actual throughput of the terminal device. Therefore, a concept of Band Width Part (BWP) is introduced. The BWP is introduced to optimize the power consumption of terminal device. For example, if the speed of the terminal device is very low, a smaller BWP can be configured for the terminal device, and if the speed of the terminal device is required to be very high, a larger BWP can be configured for the terminal device. If the terminal device supports high rate or operates in the CA mode, multiple BWPs can be configured for the terminal device. Another purpose of BWP is to trigger the coexistence of multiple basic numerologies in a cell, such as a numerology 1 corresponding to BWP1 and a numerology 2 corresponding to BWP2.

A terminal device can be configured with up to 4 uplink BWPs and up to 4 downlink BWPs through Radio Resource Control (RRC) dedicated signaling, but only one uplink BWP and one downlink BWP can be activated at the same time. In the RRC dedicated signaling, a first active BWP among the configured BWPs may be indicated. Furthermore, when the terminal device is in a connected state, the terminal device can be switched between different BWPs through Downlink Control Information (DCI). When the carrier in an inactive state enters an active state, the first active BWP is a first active BWP configured in the RRC dedicated signaling. Configuration parameters for each BWP include:

Subcarrier Spacing (subcarrierSpacing);
Cyclic prefix (cyclicPrefix);
First Physical Resource Block (PRB) of the BWP and the number of consecutive PRBs (locationAndBandwidth);
BWP identifier (bwp-Id); and
BWP public configuration parameter (bwp-Common) and BWP private configuration parameter (bwp-Dedicated).

The Radio Link Monitor (RLM) is operated by the terminal device only on the active BWPs, but not on the inactive BWPs, and when the terminal device is switched between different BWPs, the timer and counter associated with the RLM do not need to be reset. The Radio Resource Management (RRM) measurements are not affected regardless of on which active BWP the terminal device sends and receives data. For the measurement of Channel Quality Indication (CQI), the terminal device only needs to perform the measurement on the active BWP.

When a carrier is deactivated and then the carrier is activated through the MAC CE, the initial first active BWP is the first active BWP configured in the RRC dedicated signaling.

The BWP id in the RRC dedicated signaling has a value ranging from 0 to 4, and a BWP with the BWP id having a value of 0 is the initial BWP by default.

A BWP indicator in DCI is 2 bits, as shown in Table 1 below. If the number of configured BWPs is less than or equal to 3, BWP indicators (which are equal to 1, 2 and 3) correspond to BWP ids (which are equal to 1, 2 and 3) respectively. If the number of BWPs is 4, BWP indicators (which are equal to 0, 1, 2 and 3) correspond to BWPs configured and indexed sequentially. Moreover, the network side uses continuous BWP ids when configuring BWPs.

TABLE 1

| Value of BWP indicator (2 bits) | BWP |
| --- | --- |
| 00 | First BWP configured by higher layers |
| 01 | Second BWP configured by higher layers |
| 10 | Third BWP configured by higher layers |
| 11 | Fourth BWP configured by higher layers |

In order to meet the requirement of high rate, the CA technology is also supported in 5G. The CA technology jointly schedules and uses resources on multiple Component Carriers (CCs), so that NR systems can support larger bandwidth, thus higher peak rate of the system can be achieved. According to the continuity of the aggregated carrier in spectrum, the CA can be divided into continuous carrier aggregation and discontinuous carrier aggregation; according to whether the aggregated carriers are located in a same band, the CA can be divided into Intra-band carrier aggregation and inter-band carrier aggregation.

In the CA, there is one and only one Primary Component Carrier (PCC, also referred to as primary cell component), and the PCC provides an RRC signaling connection, a Non-Access Stratum (NAS) function, security and so on. The Physical Uplink Control Channel (PUCCH) exists on and only on the PCC. In the CA, there can be one or more Secondary Component Carriers (SCCs, also referred to as secondary cell components), and the SCC only provides additional radio resources. The PCC and SCC are both called serving cells, the cell on the PCC is the primary cell (Pcell) and the cell on the SCC is the secondary cell (Scell). It is further stipulated in the standards that a maximum of 5 carriers can be supported to be aggregated, that is, the maximum bandwidth after the aggregation is 100 MHz, and the aggregated carriers belong to the same base station. All aggregated carriers use a same Cell-Radio Network Temporary Identifier (C-RNTI), and the base station ensures that C-RNTIs do not collide in the cells where the carriers are located. Because asymmetric carrier aggregation and symmetric carrier aggregation are supported, it is required that the aggregated carriers must include a downlink carrier, but may not include an uplink carrier. Moreover, for a primary carrier cell, there must be a Physical Downlink Control Channel (PDCCH) and a PUCCH of the cell, and only the primary carrier cell has the PUCCH, while other secondary carrier cells may have the PDCCH.

Figure 2A:
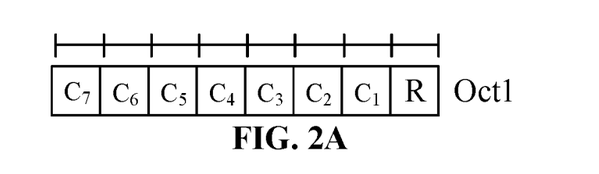
FIG. 2A is a first schematic diagram of a Scell activation/deactivation Media Access Control Control Element (MAC CE) according to an embodiment of the present disclosure.
Figure 2B:
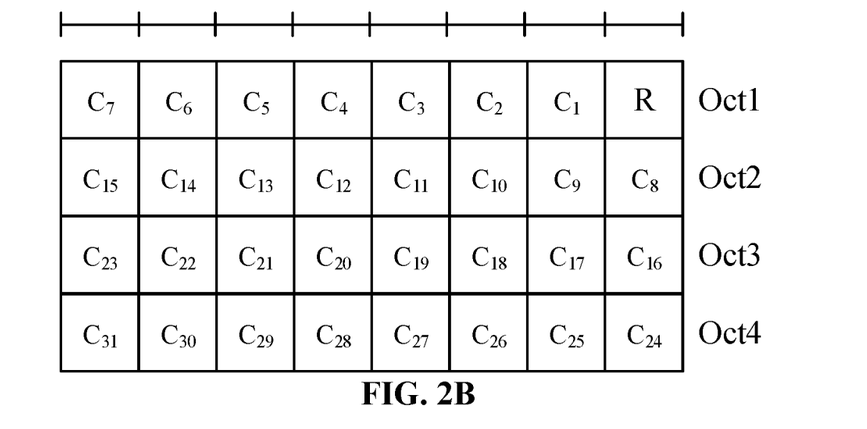
FIG. 2B is a second schematic diagram of a Scell activation/deactivation MAC CE provided by an embodiment of the present disclosure.

The Scell is configured through the RRC dedicated signaling, and an initial state is configured to be an inactive state, in which data cannot be sent and received. Then the data can be sent and received after the Scell is activated through the MAC CE. As shown in FIG. 2A and FIG. 2B, in FIG. 2A, the Scell activation/deactivation MAC CE includes 1 byte and is used for controlling the states of 7 Scells; and in FIG. 2B, the Scell activation/deactivation MAC CE includes 4 bytes and is used for controlling the states of 31 Scells, where $C_i$ represents a state of a Scell whose serving cell index is i. Setting $C_i$ to be 1 indicates that the corresponding Scell is in an inactive state (i.e., deactivated state), and setting $C_i$ to be 0 indicates that the corresponding Scell is in an active state.

In the OFDM transmission mechanism, the DC carrier is actually not used. For a transmitter of a base station, due to the local oscillator leakage in Intermediate frequency (IF) (if a primary frequency conversion scheme is adopted) or Radio frequency (RF) (if a zero IF scheme is adopted), a large noise will be generated in the middle (at the carrier frequency) of the final transmitted signal. If a data symbol is modulated on the DC carrier at the time of transmission, the transmission Error Vector Magnitude (EVM) of the data symbol will be very poor, and the signal-to-noise ratio is usually negative several dB, so the protocols stipulate that no data symbol is transmitted on this DC carrier. Generally speaking, in a measurement at the antenna port of the transmitter, the power on DC carrier is required to be lower than the total transmission power by more than 20 dB. The main reason is to avoid wasting Power Amplifier (PA) to send the useless DC carriers and avoid too strong DC carrier from affecting the normal operation of RF Automatic Generation Control (AGC) of the receiver of the terminal device. For the receiver of terminal device, the zero IF scheme is generally adopted, and the reception of the local oscillator leakage will directly produce strong noise on a DC carrier of a baseband, that is to say, if there is data symbol modulation on the DC carrier, the signal-to-noise ratio for reception on the DC carrier will be much poorer than other subcarriers, so the DC carrier is not suitable for data symbols.

In the NR, the uplink DC carrier location information is reported to the network side in the RRC ReconfigurationComplete message or the RRCResumeComplete message, so that the network side removes a received part corresponding to the DC carrier location when the network side demodulates the data. Currently, the DC carrier location information is reported for each BWP on each CC. However, for the case of multiple carriers in the CA scenario, the reporting of the DC carrier location may need to consider the case of multiple SCells, such as a scenario where a PA is shared, for example in a case where each of two serving cells has four BWPs, a combination of any two active BWPs may correspond to a distinct DC carrier location, so it is necessary to report 16 pieces of DC carrier location information, with reference to Table 2 below. In order to clarify how the terminal device reports the DC carrier location information in the CA scenario, the following technical scheme of the embodiments of the disclosure is proposed.

It should be noted that the DC carrier location in the embodiments of the present disclosure is the uplink DC carrier location, and the BWP in the embodiments of the present disclosure is the uplink BWP.

Figure 3:
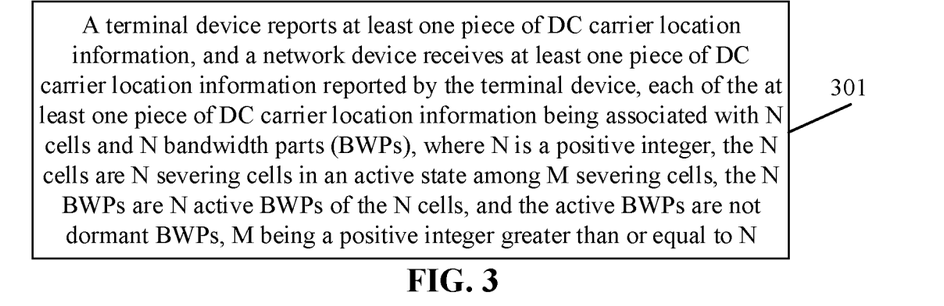
FIG. 3 is a flowchart of a method for reporting a DC carrier location according to an embodiment of the present disclosure.

FIG. 3 is a flowchart of a method for reporting a DC carrier location according to an embodiment of the present disclosure. As shown in FIG. 3, the method for reporting a DC carrier location includes operation 301.

In operation 301, a terminal device reports at least one piece of DC carrier location information, and a network device receives the at least one piece of DC carrier location information reported by the terminal device. Each of the at least one piece of DC carrier location information is associated with N cells and N bandwidth parts (BWPs), where N is a positive integer. The N cells are N severing cells in an active state among M severing cells, the N BWPs are N active BWPs of the N cells, and the active BWPs are not dormant BWPs; and M is a positive integer greater than or equal to N.

In the embodiment of the present disclosure, the network device may be a base station, such as, a gNB.

In the embodiment of the present disclosure, when the terminal device determines the DC carrier location, the terminal device only considers the serving cells in an active state and the active BWPs of the serving cells are not the dormant BWPs.

It should be noted that for a serving cell in a deactivated state, the serving cell does not send the uplink data, so the serving cell is not considered when the DC carrier location is determined. In addition, for a case where the active BWPs of the serving cell in the active state are the dormant BWPs, the serving cell also does not send uplink data, so that the serving cell is also not considered when the DC carrier location is determined.

TABLE 2

| | |
|---|---|
| RRCReconfigurationComplete-v1530-IEs ::= | SEQUENCE { |
| uplinkTxDirectCurrentList OPTIONAL, | UplinkTxDirectCurrentList |
| nonCriticalExtension OPTIONAL } | RRCReconfigurationComplete-v1560-IEs |
| ========== | |
| RRCResumeComplete-IEs ::= | SEQUENCE { |
| dedicatedNAS-Message OPTIONAL, | DedicatedNAS-Message |
| selectedPLMN-Identity OPTIONAL, | INTEGER (1..maxPLMN) |
| uplinkTxDirectCurrentList OPTIONAL, | UplinkTxDirectCurrentList |
| lateNonCriticalExtension OPTIONAL, | OCTET STRING |
| nonCriticalExtension OPTIONAL } | RRCResumeComplete-v1610-IEs |
| UplinkTxDirectCurrentList ::= UplinkTxDirectCurrentCell | SEQUENCE (SIZE (1..maxNrofServingCells)) OF |
| UplinkTxDirectCurrentCell ::= | SEQUENCE { |
| servCellIndex | ServCellIndex, |
| uplinkDirectCurrentBWP UplinkTxDirectCurrentBWP, ..., [[ | SEQUENCE (SIZE (1..maxNrofBWPs)) OF |
| uplinkDirectCurrentBWP-SUL UplinkTxDirectCurrentBWP ]] } | SEQUENCE (SIZE (1..maxNrofBWPs)) OF OPTIONAL |
| UplinkTxDirectCurrentBWP ::= | SEQUENCE { |
| bwp-Id | BWP-Id, |
| shift7dot5kHz | BOOLEAN, |
| txDirectCurrentLocation } | INTEGER (0..3301) |

In the embodiment of the present disclosure, in the CA scenario, the cells providing services for the terminal device include M serving cells. When the DC carrier location is determined, the terminal device only needs to consider the serving cells in the active state among the M serving cells and the active BWPs, which are not dormant BWPs, of these serving cells in the active state.

For example, when M=3, the three serving cells are Cell1, Cell2 and Cell3, respectively. The BWPs of Cell1 include BWP11, and BWP12; the BWPs of Cell2 include BWP21 and BWP22; and the BWPs of Cell3 include BWP31 and BWP32.

The serving cell in the active state has six cases as follows.

In case 1, Cell1, Cell2 and Cell3 are in the active state.
In case 2, Cell1 and Cell2 are in the active state.
In case 3, Cell2 and Cell3 are in the active state.
In case 4, Cell1 is in the active state.
In case 5, Cell2 is in the active state.
In case 6, Cell3 is in the active state.

For each of the above cases, the cases of the active BWPs can be further subdivided. Taking the case 2 above as an example, the Cell1 and the Cell2 are in the active state, and the cases of the active BWPs include four cases.

In case I, the active BWPs are the BWP11 and the BWP21.
In case II, the active BWPs are the BWP11 and the BWP22.
In case III, the active BWPs are the BWP21 and the BWP21.
In case IV, the active BWPs are the BWP21 and the BWP22.

That is to say, the case 2 is further subdivided into four cases, which correspond to different DC carrier locations respectively, and the terminal device can report four pieces of DC carrier location information for these four cases.

Similarly, each of the cases 1, 3, 4, 5 and 6 above can also be further subdivided into different cases that correspond to different DC carrier locations.

In the embodiment of the present disclosure, the reporting of the at least one piece of DC carrier location information can be triggered by four trigger modes.

First Trigger Mode

The terminal device reports at least one piece of DC carrier location information in response to the terminal device receiving the SCell activation/deactivation command. The SCell activation/deactivation command is used for at least one of: activating at least one of the M serving cells, or deactivating the at least one of the M serving cells.

Herein, as to the SCell activation/deactivation command, reference may be made to the foregoing description of the SCell activation/deactivation MAC CE.

The reception of the SCell activation/deactivation command by the terminal device represents that the state of at least one of the M cells has changed, the change in state means that the state changes from the active state to the deactivated state or from the deactivated state to the active state. In this case, the DC carrier location information changes, and the terminal device determines the DC carrier location information according to the latest active state and/or deactivated state of each serving cell, and reports determined DC carrier location information.

Second Trigger Mode

The terminal device reports at least one piece of DC carrier location information in response to an uplink BWP switching occurring in at least one of the M serving cells.

Herein, the case where the uplink BWP switching occurs in the serving cell means that the switching of the active BWP of the serving cell occurs, for example, the active BWP of the Cell 2 has been switched from BWP21 to BWP22. It should be noted that the uplink BWP switching may occur in one of the M serving cells, or in multiple ones of the M serving cells. In this case, the DC carrier location information changes, and the terminal device determines the DC carrier location information according to the latest active BWPs of each serving cell, and reports determined DC carrier location information.

Third Trigger Mode

The terminal device reports the at least one piece of DC carrier location information in response to the terminal device receiving BWP dormancy indication information. The BWP dormancy indication information is used for indicating that the active BWP of at least one of the M serving cells enters the dormant BWP or leaves the dormant BWP.

Herein, if the active BWP of one of the M serving cells becomes the dormant BWP, and/or, if the active BWP of one of the M serving cells becomes a non-dormant BWP (i.e., leaves the dormant BWP), the DC carrier location information will also change. The terminal device determines the DC carrier location information according to the latest active BWP of each serving cell, and reports determined DC carrier location information.

Fourth Trigger Mode

The terminal device reports the at least one piece of DC carrier location information in response to the terminal device receiving a serving cell configuration, a BWP configuration, a serving cell reconfiguration or a BWP reconfiguration.

In the embodiments of the present disclosure, the terminal device can report the at least one piece of the DC carrier location information through two reporting modes.

First Reporting Mode

The terminal device reports a first MAC CE, and the network device receives the first MAC CE reported by the terminal device. The first MAC CE is used for indicating the at least one piece of DC carrier location information.

Each of the at least one piece of DC carrier location information is associated with a Power Amplifier (PA) or a spectrum range. The first MAC CE includes the at least one piece of DC carrier location information, each of the at least one piece of DC carrier location information being associated with at least one of: a frequency band number, a PA number, an index of the DC carrier location, an index configured by higher layer and associated with the DC carrier location, or a serving cell identifier.

In the embodiment of the present disclosure, a new MAC CE (i.e., the first MAC CE) may be defined, and a new Logical Channel Identifier (LCID) may be defined for the MAC CE to identify the MAC CE. The first MAC CE is used for indicating the at least one piece of DC carrier location information. There may be one or more pieces of DC carrier location information indicated by the first MAC CE. Each piece of DC carrier location information is associated with a PA, or a spectrum range (such as FR1 or FR2), or a frequency band number, or a PA number, or an index of the DC carrier location information, or an index configured by higher layer.

It should be noted that the aforementioned content associated with the DC carrier location information can be carried in the first MAC CE.

Second Reporting Mode

The terminal device reports a first RRC signaling, and the network device receives the first RRC signaling reported by the terminal device. The first RRC signaling is used for indicating at least one piece of DC carrier location information.

The first RRC signaling includes the at least one piece of DC carrier location information. 1) In an optional implementation, each of the at least one piece of DC carrier location information is associated with a list of serving cell identifiers and a list of BWP identifiers. The list of serving cell identifiers is used for determining the N serving cells in the active state, and the list of BWP identifiers is used for determining the N active BWPs of the N serving cells. Alternatively, 2) in another optional implementation, each of the at least one piece of DC carrier location information is associated with a first value and a second value. The first value is used for representing a combined identifier of the N serving cells in the active state, and the second value is used for representing a combined identifier of the N active BWPs of the N serving cells.

In the embodiment of the present disclosure, the first RRC signaling may optionally be an RRCReconfigurationComplete message or an RRCResumeComplete message.

It should be noted that the content associated with the DC carrier location information can be carried in the first RRC signaling.

In one example, when M=3, the three serving cells are Cell1, Cell2 and Cell3, respectively. The BWPs of Cell1 include BWP11, and BWP12; the BWPs of Cell2 include BWP21, and BWP22; and the BWPs of Cell 3 include BWP31 and BWP32. For the case I in the case 2, Cell1 and Cell2 are in the active state, and the active BWPs are BWP11 and BWP21. The DC carrier location information corresponding to this case is associated with a list of serving cell identifiers {Cell1, Cell2} and a list of BWP identifiers {BWP11, BWP21}. The pieces of DC carrier location information corresponding to the different cases are associated with different lists of serving cell identifiers and/or different lists of BWP identifiers.

In one example, when M=3, the three serving cells are Cell1, Cell2 and Cell3. The BWPs of Cell1 include BWP11 and BWP12; the BWPs of Cell2 include BWP21 and BWP22; and the BWPs of Cell 3 include BWP31 and BWP32. For case I in case 2, the Cell1 and the Cell2 are in active state, and the active BWPs are BWP11 and BWP21. The first value associated with the DC carrier location information corresponding to this case is used for indicating a combination of the Cell1 and the Cell2, the second value associated with the DC carrier location information corresponding to this case is used for indicating a combination of BWP11 and BWP21.

In the above scheme, the first value can be represented by P1 bits, and the value of P1 is related to the value of M. The second value may be represented by P2 bits, and the value of P2 is related to the number of BWPs in the serving cell.

In the above schemes of the embodiments of the present disclosure, the DC carrier location information includes at least one of: an indication of a shift of 7.5 KHz, or txDirectCurrentLocation, as shown in Table 3 below.

TABLE 3

| | |
|---|---|
| shift7dot5kHz | BOOLEAN, |
| txDirectCurrentLocation | INTEGER |
| (0..3301) | |

Figure 4:
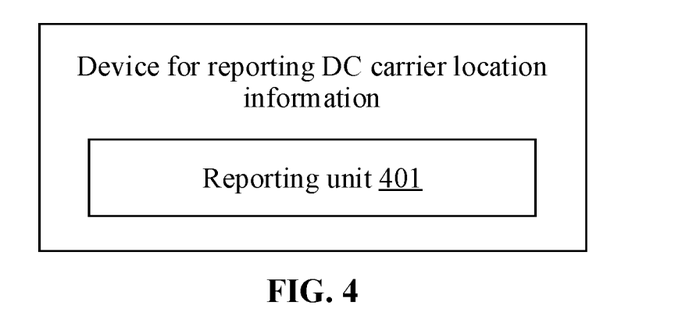
FIG. 4 is a first schematic structural diagram of a device for reporting a piece of DC carrier location information according to an embodiment of the present disclosure.

FIG. 4 is the first schematic structural diagram of a device for reporting DC carrier location information according to an embodiment of the present disclosure. The reporting device is applied to the terminal device. As shown in FIG. 4, the device for reporting DC carrier location information includes a reporting unit 401.

The reporting unit 401 is configured to report at least one piece of DC carrier location information. Each of the at least one piece of DC carrier location information is associated with N cells and N BWPs, where N is a positive integer The N cells are N severing cells in an active state among M severing cells, the N BWPs are N active BWPs of the N cells, and the active BWPs are not dormant BWPs; and M is a positive integer greater than or equal to N.

In an optional implementation, the reporting unit 401 is configured to report the at least one piece of DC carrier location information in response to the terminal device receiving a Secondary Cell (SCell) activation/deactivation command, where the SCell activation/deactivation command is used for at least one of: activating at least one of the M serving cells, or deactivating the at least one of the M serving cells.

In an optional implementation, the reporting unit 401 is configured to report the at least one piece of DC carrier location information in response to an uplink BWP switching occurring in at least one of the M serving cells.

In an optional implementation, the reporting unit 401 is configured to report the at least one piece of DC carrier location information in response to the terminal device receiving BWP dormancy indication information, where the BWP dormancy indication information is used for indicating that the active BWP of at least one of the M serving cells enters the dormant BWP or leaves the dormant BWP.

In an optional implementation, the reporting unit 401 is configured to report the at least one piece of DC carrier location information in response to the terminal device receiving a serving cell configuration, a BWP configuration, a serving cell reconfiguration or a BWP reconfiguration.

In an optional implementation, the reporting unit 401 is configured to report the MAC CE used for indicating the at least one piece of DC carrier location information.

In an optional implementation, each of the at least one piece of DC carrier location information is associated with a PA or a spectrum range.

The first MAC CE includes the at least one piece of DC carrier location information, each of the at least one piece of DC carrier location information being associated with at least one of: a frequency band number, a PA number, an index of the DC carrier location information, an index configured by higher layer and associated with the DC carrier location, or a serving cell identifier.

In an optional implementation, the reporting unit 401 is configured to report a first RRC signaling used for indicating the at least one piece of DC carrier location information.

In an optional implementation, the first RRC signaling includes the at least one piece of DC carrier location information.

Each of the at least one piece of DC carrier location information is associated with a list of serving cell identifiers and a list of BWP identifiers, where the list of serving cell identifiers is used for determining the N serving cells in the active state, and the list of BWP identifiers is used for determining the N active BWPs of the N serving cells.

Optionally, each of the at least one piece of DC carrier location information is associated with a first value and a second value, where the first value is used for representing a combined identifier of the N serving cells in the active state, and the second value is used for representing a combined identifier of the N active BWPs of the N serving cells.

In an optional implementation, the DC carrier location information includes at least one of: an indication of a shift of 7.5 KHz, or xDirectCurrentLocation.

It should be understood by those skilled in the art that the description of the device for reporting a DC carrier location in the embodiments of the present disclosure can be understood with reference to the description of the method for reporting the DC carrier location in the embodiments of the present disclosure.

Figure 5:
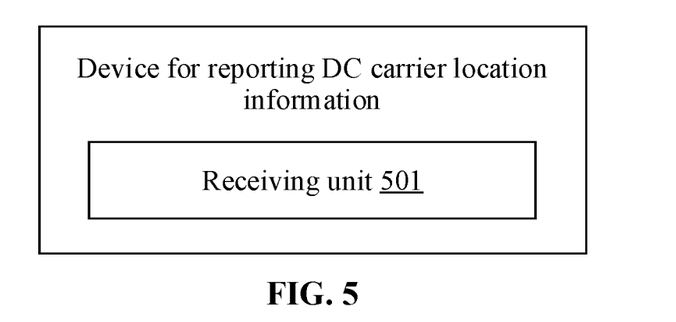
FIG. 5 is a second schematic structural diagram of a device for reporting a DC carrier location according to an embodiment of the present disclosure.

FIG. 5 is the second schematic structural diagram of a device for reporting DC carrier location information according to an embodiment of the present disclosure. As shown in FIG. 5, the reporting device for reporting DC carrier location information includes a receiving unit 501.

The receiving unit 501 is configured to receive at least one piece of DC carrier location information reported by a terminal device. Each of the at least one piece of DC carrier location information is associated with N cells and N bandwidth parts (BWPs), where N is a positive integer.

The N cells are N severing cells in an active state among M severing cells, the N BWPs are N active BWPs of the N cells, and the active BWPs are not dormant BWPs; and M is a positive integer greater than or equal to N.

In an optional implementation, the receiving unit 501 is configured to receive the MAC CE used for indicating the at least one piece of DC carrier location information.

In an optional implementation, each of the at least one piece of DC carrier location information is associated with a PA or a spectrum range.

The first MAC CE includes the at least one piece of DC carrier location information, each of the at least one piece of DC carrier location information being associated with at least one of: a frequency band number, a PA number, an index of the DC carrier location information, an index configured by higher layer and associated with the DC carrier location, or a serving cell identifier.

In an optional implementation, the receiving unit 501 is configured to receive a first Radio Resource Control (RRC) signaling reported by the terminal device, where the RRC signaling is used for indicating the at least one piece of DC carrier location information.

In an optional implementation, the first RRC signaling includes the at least one piece of DC carrier location information.

Each of the at least one piece of DC carrier location information being associated with a list of serving cell identifiers and a list of BWP identifiers, where the list of serving cell identifiers is used for determining the N serving cells in the active state, and the list of BWP identifiers is used for determining the N active BWPs of the N serving cells.

Optionally, each of the at least one piece of DC carrier location information being associated with a first value and a second value, where the first value is used for representing a combined identifier of the N serving cells in the active state, and the second value is used for representing a combined identifier of the N active BWPs of the N serving cells.

In an optional implementation, the DC carrier location information includes at least one of: an indication of a shift of 7.5 KHz, or xDirectCurrentLocation.

It should be understood by those skilled in the art that the description of the device for reporting a DC carrier location in the embodiments of the present disclosure can be understood with reference to the description of the method for reporting the DC carrier location method in the embodiments of the present disclosure.

Figure 6:
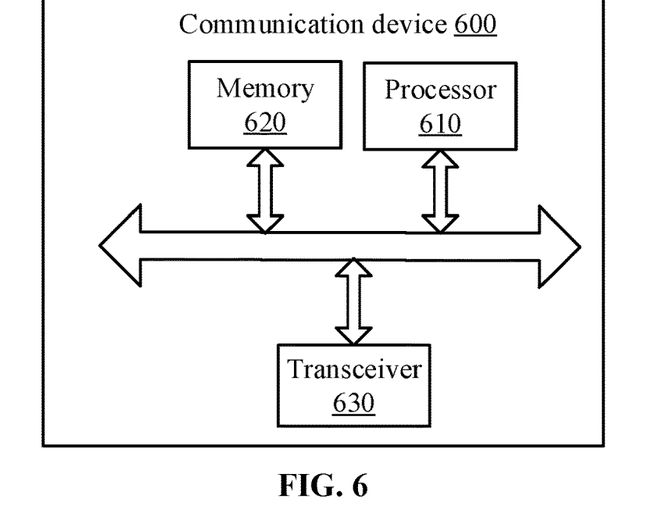
FIG. 6 is a schematic structural diagram of a communication device according to an embodiment of the present disclosure.

FIG. 6 is a schematic structural diagram of a communication device 600 according to an embodiment of the present disclosure. The communication device can be a terminal device or a network device. The communication device 600 illustrated in FIG. 6 includes processor 610, and processor 610 can invoke and run computer programs from memory to implement the method in the embodiments of the present disclosure.

Optionally, as illustrated in FIG. 6, the communication device 600 may further include a memory 620. The processor 610 can invoke and run the computer program from memory 620 to implement the method in the embodiments of the disclosure.

The memory 620 may be a separate device independent of or integrated into the processor 610.

Optionally, as illustrated in FIG. 6, the communication device 600 may also include a transceiver 630. The processor 610 may control the transceiver 630 to communicate with other devices, in particular, to send information or data to other devices, or receive information or data sent by other devices.

The transceiver 630 may include a transmitter and a receiver. The transceiver 630 may further include an antenna(s), the number of which may be one or more.

Optionally, the communication device 600 can be specifically a network device of the embodiment of the present disclosure, and the communication device 600 can realize the corresponding process realized by the network device in each method of the embodiments of the present disclosure. For the sake of simplicity, it will not be elaborated herein.

Optionally, the communication device 600 can be a mobile terminal/a terminal device according to the embodiments of the present disclosure, and the communication device 600 can realize the corresponding flow realized by the mobile terminal/the terminal device in the various methods of the embodiments of the present disclosure. For the sake of brevity, it will not be described herein.

Figure 7:
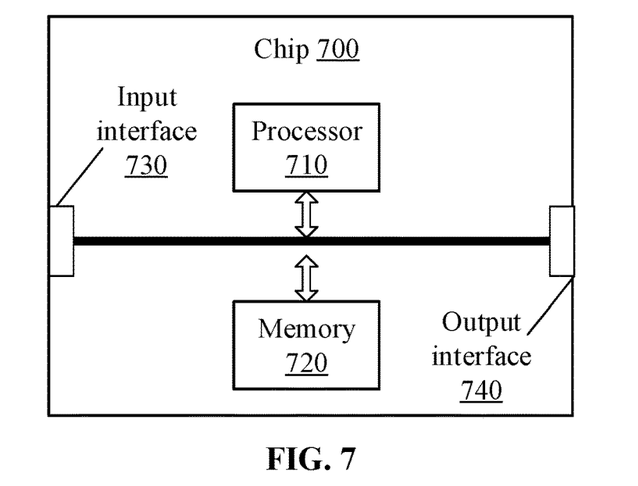
FIG. 7 is a schematic structural diagram of a chip according to an embodiment of the present disclosure.

FIG. 7 is a schematic structural diagram of a chip according to an embodiment of the present disclosure. The chip 700 illustrated in FIG. 7 includes processor 710, and processor 710 can invoke and run computer programs from memory to implement the method in the embodiments of the disclosure.

Optionally, as illustrated in FIG. 7, the chip 700 may also include a memory 720. The processor 710 can invoke and run the computer program from memory 720 to implement the method in the embodiments of the disclosure.

The memory 720 may be a separate device independent of or integrated into the processor 710.

Optionally, the chip 700 may also include an input interface 730. The processor 710 can control the input interface 730 to communicate with other devices or chips, and in particular can obtain information or data sent by other devices or chips.

Optionally, the chip 700 may also include an output interface 740. The processor 710 may control the output interface 740 to communicate with other devices or chips, and in particular may output information or data to other devices or chips.

Optionally, the chip can be applied to the network device in the embodiments of the present disclosure, and the chip can implement the corresponding process realized by the network device in each method of the embodiments of the disclosure. For the sake of brevity, it will not be elaborated herein.

Optionally, the chip can be applied to the mobile terminal/terminal device in the embodiments of the present disclosure, and the chip can implement the corresponding flow realized by the mobile terminal/terminal device in each method of the embodiment of the disclosure. For the sake of simplicity, it will not be described herein.

It is to be understood that the chips mentioned in the embodiments of the present disclosure can also be referred to as system level chips, system chips, chip systems or on-chip system chips, etc.

Figure 8:
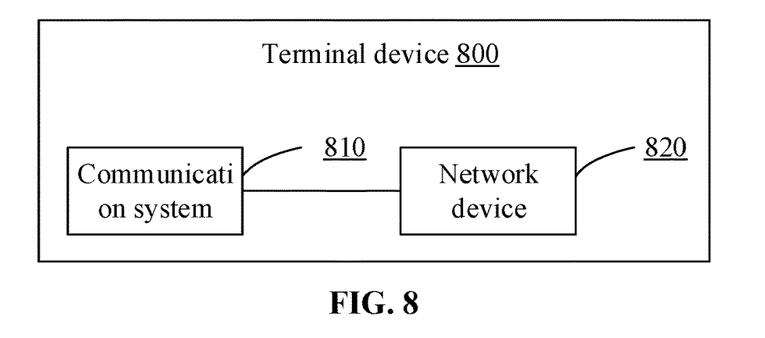
FIG. 8 is a schematic block diagram of a communication system according to an embodiment of the present disclosure.

FIG. 8 is a schematic block diagram of a communication system 800 provided by an embodiment of the present disclosure. As illustrated in FIG. 8, the communication system 800 includes a terminal device 810 and a network device 820.

The terminal device 810 can be used to realize the corresponding functions realized by the terminal device in the above method, and the network device 820 can be used to realize the corresponding functions realized by the network device in the above method. For the sake of simplicity, it will not be elaborated herein.

It is to be understood that the processor of the embodiment of the present disclosure may be an integrated circuit chip with signal processing capability. In the implementation process, each step of the above method embodiment can be completed by the instruction in the form of integrated logic circuit of hardware or software in the processor. The above processors can be general purpose processors, digital signal processors (DSPS), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or nonvolatile memory, or may include both volatile and nonvolatile memory. The nonvolatile memory can be read-only memory (ROM), programmable ROM (PROM), erasable Prom (EPROM), electrically erasable EPROM (EEPROM) or flash memory. Volatile memory can be random access memory (RAM), which is used as an external cache. Many forms of RAM are available, such as static RAM (SRAM), dynamic RAM (DRAM), synchronous DRAM (SDRAM), double data rate SDRAM (DDR SDRAM, enhanced SDRAM (ESDRAM), synchlink DRAM (SLDRAM) and direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the present disclosure can also be static RAM (SRAM), dynamic RAM (DRAM), synchronous dynamic random access memory (synchronous DRAM (SDRAM), double data rate SDRAM (DDR SDRAM), enhanced SDRAM (ESDRAM), synchronous link DRAM (SLDRAM), direct RAM (DR RAM), etc. That is to say, the memory in the embodiments of the present disclosure is intended to include, but not limited to, these and any other suitable types of memory.

The embodiments of the present disclosure also provide a computer-readable storage medium for storing computer programs.

Optionally, the computer-readable storage medium can be applied to the network device in the embodiment of the present disclosure, and the computer program enables the computer to execute the corresponding processes implemented by the network device in the various methods of the embodiment of the present disclosure. For the sake of brevity, it will not be repeated herein.

Optionally, the computer-readable storage medium can be applied to the mobile terminal/terminal device in the embodiment of the present disclosure, and the computer program enables the computer to execute the corresponding processes implemented by the mobile terminal/terminal device in the various methods of the embodiment of the present disclosure. For the sake of brevity, it will not be repeated herein.

The embodiment of the present disclosure also provides a computer program product, including a computer program instruction.

Optionally, the computer program product can be applied to the network device in the embodiments of the present disclosure, and the computer program instruction enables the computer to execute the corresponding processes implemented by the network device in the various methods of the embodiment of the disclosure. For the sake of brevity, it will not be repeated herein.

Optionally, the computer program product can be applied to the mobile terminal/terminal device in the embodiments of the present disclosure, and the computer program instruction enables the computer to execute the corresponding process implemented by the mobile terminal/terminal device in the various methods of the embodiment of the disclosure, for the sake of brevity, it will not be repeated herein.

The embodiment of the present disclosure also provides a computer program.

Optionally, the computer program can be applied to the network device in the embodiments of the present disclosure. When the computer program runs on the computer, the computer executes the corresponding process realized by the network device in each method of the embodiment of the disclosure. For the sake of brevity, it will not be described herein.

Optionally, the computer program can be applied to the mobile terminal/terminal device in the embodiments of the present disclosure. When the computer program runs on the computer, the computer executes the corresponding process realized by the mobile terminal/terminal device in the various methods of the embodiment of the disclosure. For the sake of brevity, it will not be elaborated herein.

Those of ordinary skill in the art may realize that the unit and algorithm steps of each example described in combination with the disclosed embodiments herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

Those skilled in the art can clearly understand that for the convenience and simplicity of the description, the specific working process of the system, device and unit described above can refer to the corresponding process in the embodiment of the method described above, and will not be described herein.

In several embodiments provided by the present disclosure, it should be understood that the disclosed systems, devices and methods can be realized in other ways. For example, the embodiment of the device described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

If the function is realized in the form of a software function unit and sold or used as an independent product, it can be stored in a computer readable storage medium. Based on such understanding, the technical solution of the present disclosure, in essence or in the form of a software product, which is stored in a storage medium, includes several instructions for making a computer device (which can be a personal computer, a server, a network device, etc.) to perform all or part of the steps of the method according to each embodiment of the present disclosure. The aforementioned storage media include: U disk, mobile hard disk, read-only memory (ROM), random access memory (RAM), disk or optical disk and other media that can store program code.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

The invention claimed is:

1. A method for reporting a Direct Current (DC) carrier location, comprising:
   reporting, by a terminal device, at least one piece of DC carrier location information, wherein each of the at least one piece of DC carrier location information is associated with N cells and N bandwidth parts (BWPs), where N is a positive integer,
   wherein the N cells are N severing cells in an active state among M severing cells, the N BWPs are N active BWPs of the N cells, and the active BWPs are not dormant BWPs; and M is a positive integer greater than N.

2. The method of claim 1, wherein reporting, by the terminal device, the at least one piece of DC carrier location information comprises:
   reporting, by the terminal device, the at least one piece of DC carrier location information in response to the terminal device receiving a serving cell configuration, a BWP configuration, a serving cell reconfiguration or a BWP reconfiguration.

3. The method of claim 2, wherein reporting, by the terminal device, the at least one piece of DC carrier location information comprises:
   reporting, by the terminal device, a first RRC signaling used for indicating the at least one piece of DC carrier location information.

4. The method of claim 1, wherein reporting, by the terminal device, the at least one piece of DC carrier location information comprises:
   reporting, by the terminal device, a first Radio Resource Control (RRC) signaling used for indicating the at least one piece of DC carrier location information.

5. The method of claim 1, wherein the DC carrier location information comprises at least one of: an indication of a shift of 7.5 KHz, or txDirectCurrentLocation.

6. A non-transitory computer-readable storage medium having stored thereon computer-executable instructions that, when executed by a processor, cause the processor to perform the method of claim 1.

7. The non-transitory computer-readable storage medium of claim 6, wherein reporting, by the terminal device, the at least one piece of DC carrier location information comprises:
   reporting, by the terminal device, the at least one piece of DC carrier location information in response to the terminal device receiving a serving cell configuration, a BWP configuration, a serving cell reconfiguration or a BWP reconfiguration.

8. A method of reporting a Direct Current (DC) carrier location, comprising:
   receiving, by a network device, at least one piece of DC carrier location information reported by a terminal device, wherein each of the at least one piece of DC carrier location information is associated with N cells and N bandwidth parts (BWPs), where N is a positive integer,
   wherein the N cells are N severing cells in an active state among M severing cells, the N BWPs are N active BWPs of the N cells, and the active BWPs are not dormant BWPs; and M is a positive integer greater than N.

9. The method of claim 8, wherein receiving, by the network device, the at least one piece of DC carrier location information reported by the terminal device comprises,
   receiving, by the network device, a first Radio Resource Control (RRC) signaling reported by the terminal device, wherein the RRC signaling is used for indicating the at least one piece of DC carrier location information.

10. The method of claim 8, wherein the DC carrier location information comprises at least one of: an indication of a shift of 7.5 KHz, or txDirectCurrentLocation.

11. A device for reporting Direct Current (DC) carrier location information, applied to a network device, comprising a processor; and a memory for storing computer-executable instructions, wherein the processor is configured to invoke and run the computer-executable instructions stored in the memory to perform operations of claim 8.

12. The device of claim 11, wherein receiving the at least one piece of DC carrier location information reported by the terminal device comprises:
 receiving a first Radio Resource Control (RRC) signaling reported by the terminal device, wherein the RRC signaling is used for indicating the at least one piece of DC carrier location information.

13. The device of claim 11, wherein the DC carrier location information comprises at least one of: an indication of a shift of 7.5 KHz, or txDirectCurrentLocation.

14. A non-transitory computer-readable storage medium having stored thereon computer-executable instructions that, when executed by a processor, cause the processor to perform the method of claim 8.

15. The non-transitory computer-readable storage medium of claim 14, wherein receiving, by the network device, the at least one piece of DC carrier location information reported by the terminal device comprises:
 receiving, by the network device, a first Radio Resource Control (RRC) signaling reported by the terminal device, wherein the RRC signaling is used for indicating the at least one piece of DC carrier location information.

16. A device for reporting a Direct Current (DC) carrier location, applied to a terminal device, comprising: a processor; and a memory for storing computer-executable instructions, wherein the processor is configured to invoke and run the computer-executable instructions stored in the memory, to perform operations of:
 reporting at least one piece of DC carrier location information, wherein each of the at least one piece of DC carrier location information is associated with N cells and N bandwidth parts (BWPs), where N is a positive integer,
 wherein the N cells are N severing cells in an active state among M severing cells, the N BWPs are N active BWPs of the N cells, and the active BWPs are not dormant BWPs; and M is a positive integer greater than N.

17. The device of claim 16, wherein reporting the at least one piece of DC carrier location information comprises:
 reporting the at least one piece of DC carrier location information in response to the terminal device receiving a serving cell configuration, a BWP configuration, a serving cell reconfiguration or a BWP reconfiguration.

18. The device of claim 17, wherein reporting the at least one piece of DC carrier location information comprises:
 reporting a first RRC signaling used for indicating the at least one piece of DC carrier location information.

19. The device of claim 16, wherein reporting the at least one piece of DC carrier location information comprises:
 reporting a first Radio Resource Control (RRC) signaling used for indicating the at least one piece of DC carrier location information.

20. The device of claim 16, wherein the DC carrier location information comprises at least one of: an indication of a shift of 7.5 KHz, or txDirectCurrentLocation.

\* \* \* \* \*